(No Model.)
J. V. LATTNER.
COMBINED HEDGE TRIMMER AND MOWER.
No. 311,333. Patented Jan. 27, 1885.
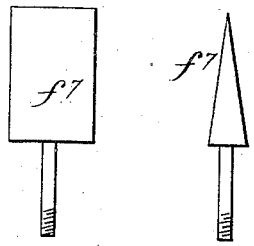
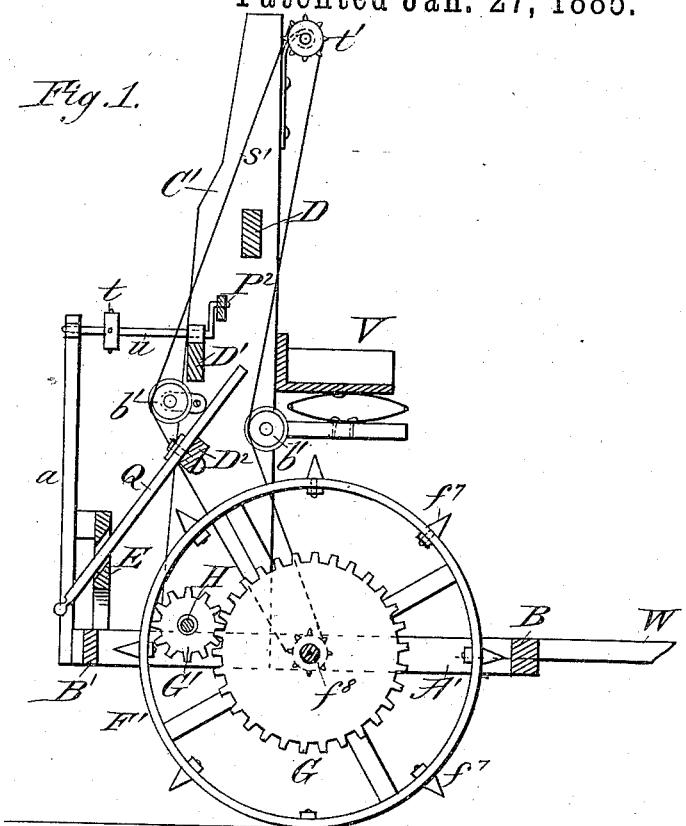
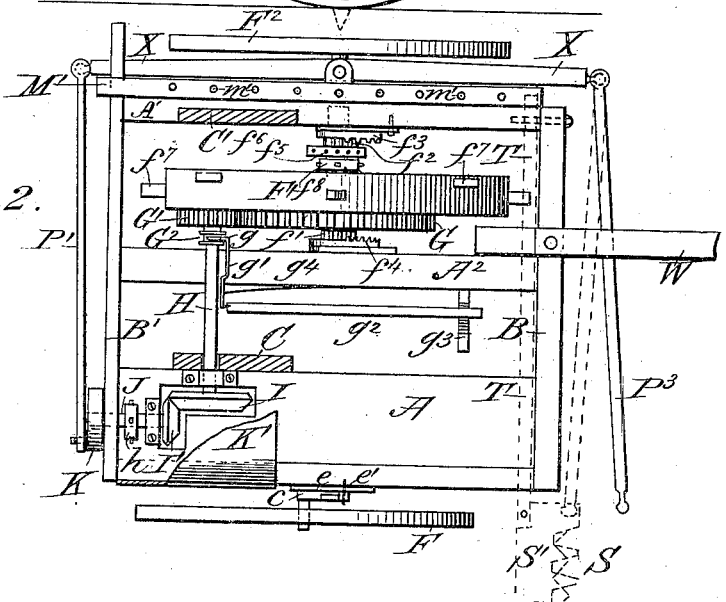
Attest:
F. H. Schott
A. R. Brown.
Inventor:
Jacob V. Lattner
by C. H. Watson & Co.
attys.

(No Model.) 4 Sheets—Sheet 2.
J. V. LATTNER.
COMBINED HEDGE TRIMMER AND MOWER.
No. 311,333. Patented Jan. 27, 1885.
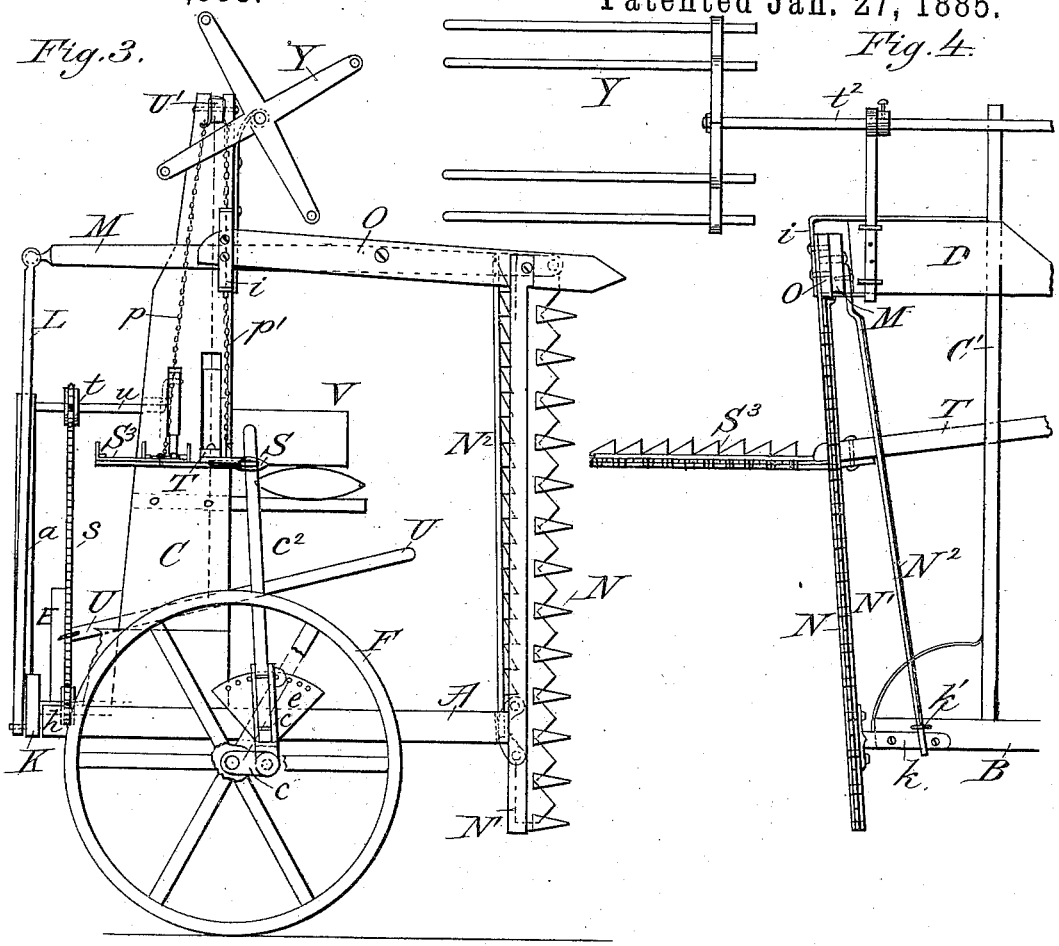
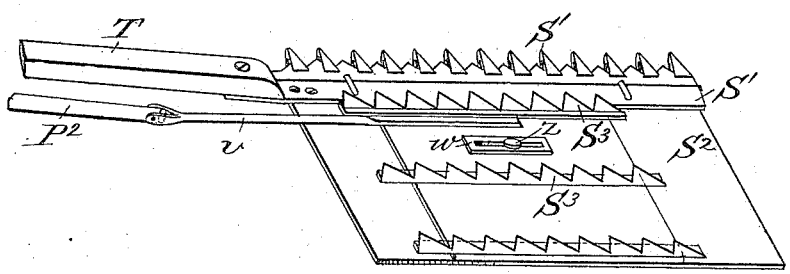
Attest:
F. H. Schott
A. R. Brown.
Inventor:
Jacob V. Lattner
per C. H. Watson & Co.
attys (No Model.) 4 Sheets—Sheet 3.
J. V. LATTNER.
COMBINED HEDGE TRIMMER AND MOWER.
No. 311,333. Patented Jan. 27, 1885.
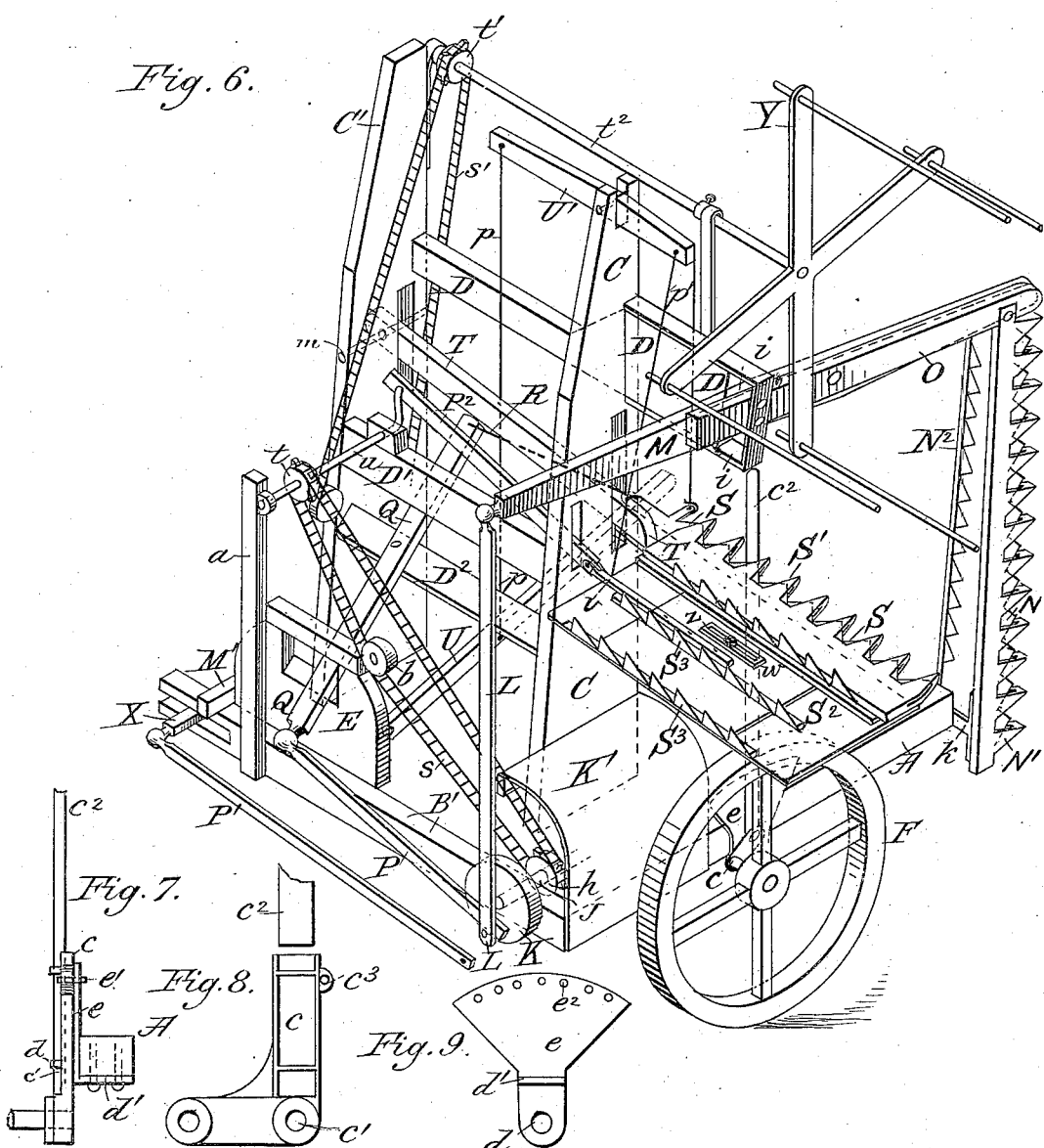

(No Model.)　　　　　　J. V. LATTNER.　　　4 Sheets—Sheet 4.
COMBINED HEDGE TRIMMER AND MOWER.
No. 311,333.　　　　　　　　　Patented Jan. 27, 1885.
Fig. 11.　　　　　Fig. 12.
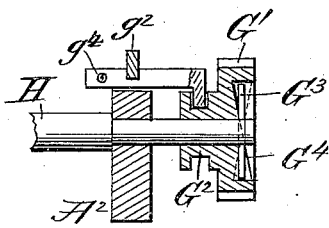
Fig. 13.
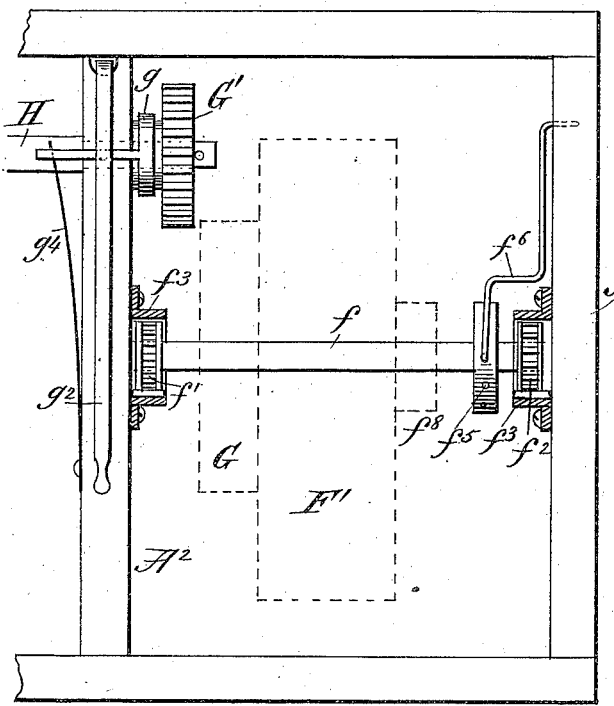
Fig. 14.
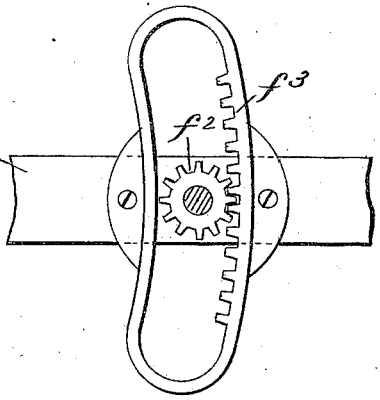
Attest:
F. H. Schott
A. R. Brown.
Inventor:
Jacob V. Lattner.
per C. H. Watson & Co.
attys

UNITED STATES PATENT OFFICE.

JACOB V. LATTNER, OF DALLAS, TEXAS.

COMBINED HEDGE-TRIMMER AND MOWER.

SPECIFICATION forming part of Letters Patent No. 311,333, dated January 27, 1885.

Application filed December 20, 1883. (No model.)

*To all whom it may concern:*

Be it known that I, JACOB V. LATTNER, a citizen of the United States, residing at Dallas, in the county of Dallas and State of Texas, have invented certain new and useful Improvements in Combined Hedge-Trimmers and Mowers, of which the following is a specification, reference being had therein to the accompanying drawings.

This invention relates to that class of combined hedge-trimmers and mowers by which the side and top of a hedge can be trimmed at the same time, and which are capable of being readily converted into a mowing-machine with but a slight alteration in the arrangement of parts.

The invention consists in certain improvements in the hedge-trimmer and mower for which Letters Patent No. 253,724 were granted to me February 14, 1882.

After describing the construction and operation of the improved machine, its novel features will be distinctly pointed out in the claims.

In the annexed drawings, illustrating my invention, Figure 1 is a vertical longitudinal section of my improved hedge-trimmer and mower. Fig. 2 is a horizontal section of the machine arranged as a mower. Fig. 3 is a side view of the machine arranged as a hedge-trimmer. Fig. 4 is a partial end view. Fig. 5 is a perspective view of the rake. Fig. 6 is a rear perspective view of the machine arranged as a hedge-trimmer; and Figs. 7 to 14 are detail views of parts to be hereinafter referred to.

Like letters of reference designate like parts in the several views.

The frame of the machine is composed of the longitudinal pieces A A' A², cross-pieces B B', and slotted standards C C', the latter being connected by transverse bars D, D', and D², arranged at different heights. A standard, $a$, and a slotted frame, E, are attached to the rear of the machine, at one side, the latter carrying at one end a pulley, $b$, the purpose of which will be presently explained.

F F' F² are the carrying and drive wheels, which are mounted on separate axles in such a manner as to permit independent adjustment, for the purpose of readily adapting the machine for use on uneven ground, as hillsides, plowed lands, &c. The axle of the wheel F is carried by a bell-crank lever, $c$, Figs. 7 and 8, which is pivoted at $c'$ to a lug, $d$, on a locking-plate, $e$, Fig. 9. This bell-crank is operated by a handle, $c^2$, that extends within reach of the driver. It will be seen that by turning the bell-crank $c$ forward or back the wheel F will be correspondingly raised or lowered with relation to the other wheels, thereby enabling the machine to maintain a horizontal position when used on uneven ground, the bell-crank being held in place at any angle by a pin, $e'$, passed through the opening $c^3$ into one of the perforations $e^2$ of the locking plate or segment $e$, which is braced and strengthened by a broad flange, $d'$, extending under the side piece, A, and firmly bolted thereto, as shown in Fig. 7. The drive-wheel F' is mounted loosely on a shaft or axle, $f$, Fig. 13. This shaft carries at each end cog-wheels $f' f^2$, which mesh into the cogs of the curved racks $f^3 f^4$, Fig. 14, that are attached, respectively, to the frame-pieces A' A², the ends of the racks $f^3 f^4$ being open at the bottom to receive said cog wheels or gears $f' f^2$. The axle or shaft $f$ also carries a locking-wheel, $f^5$, said locking-wheel being rigid with the shaft, so that the latter can be held at any desired elevation by means of a pawl, $f^6$, which is pivoted to the standard C'. When the locking-wheel $f^5$ is rotated by means of a small handspike, it causes the pinions $f' f^2$ on the shaft $f$ to travel up or down in the cogged racks $f^3 f^4$, thereby raising or lowering the shaft $f$ and driving-wheel F', and the pawl $f^6$ being then brought into engagement with one of the recesses in the periphery of the locking-wheel, it is held securely in place. The driving-wheel F' can thus be raised and lowered at pleasure, and when elevated so as not to come in contact with the soil the machine will be supported by the carrying-wheels F' F² alone. The carrying-wheel F² is detachable, and is ordinarily used only when the machine is being taken from place to place, the drive-wheel F' being then raised from the ground, as above described. The periphery of the driving-wheel F' is provided at intervals with spurs, teeth, or wedge-shaped spades $f^7$, Fig. 10, that bite into the ground and prevent the wheel from dragging or slipping. The wheel is thus made to turn on its axle in such a manner as to actuate the connected gearing and impart a slow motion to the cutting mechanism, thereby enabling the knives to cut heavy weeds, brush, &c., without breaking. Hitherto a rapid motion has been given to the knives to compensate for the slip of the ordinary driving-wheel, consequently weakening the knives or cutters, and causing a great strain on horses and machine. All this is obviated by my invention.

To the driving-wheel F′ is attached a large gear-wheel, G, which meshes with a pinion, G′, mounted upon one end of a shaft, H, which is hung in suitable bearings.

The shaft H, Fig. 12, is provided with a collar, $G^2$, that is arranged on one side of the pinion G′, a pin, $G^3$, being passed through the end of the shaft on the other side of said pinion in such a manner as to hold in place an inclined-plane clamp, $G^4$, the parts being so arranged that when the machine is backed the pinion G′ will be thrown out of mesh with gear-wheel G. The collar $G^2$ forms part of a clutch, the other jaw, $g$, of which is carried by a notched bar, $g'$, Fig. 11, that is connected to a lever, $g^2$, which extends within reach of the driver, and is held in any required position by a rack, $g^3$, Fig. 2, a spring, $g^4$, being connected with the notched bar $g'$ in such a manner as to force the pinion G′ into mesh with the gear G when the lever $g^2$ is released. The pinion G′ can thus be readily thrown in or out of mesh at pleasure. The counter-shaft H carries a beveled gear-wheel, I, which meshes with a bevel-pinion, I′, mounted upon a longitudinal shaft, J, that carries a sprocket-wheel, $h$, and a crank-wheel, K. This crank-wheel actuates a pitman, L, the upper end of which is connected by a ball-and-socket joint to the rear end of a lever, M, which is pivoted to a horizontal bar, O, that is attached to the projecting end of the cross-bar D by means of a strap, $i$. This strap holds the bar O away from the cross-bar, and thus allows the lever M to play freely on its pivot. The forward end of the lever M is connected to the upper end of a vertically-inclined cutter or knife, N, which reciprocates in the stationary finger-bar N′. The top of this finger-bar N′ is secured to the forward end of the horizontal bar O, and its lower end is connected to the front cross-bar, B, by means of a brace, $k$. The knife N and finger-bar or casing N′ are slightly inclined outward toward the top, so that the bottom of the trimmed hedge will be left broader than the top. They may, however, be arranged in any other manner, if desired.

To the pin on the crank-wheel K is also attached one end of a horizontal pitman, P, the other end of which is connected by ball-and-socket joint to the rear end of an inclined lever, Q, Figs. 1 and 6, that passes through a slot in the frame E, and is pivoted to the cross-bar $D^2$.

To the upper or forward end of the lever Q is attached a connecting-rod, R, which passes through the forward slot in the standard C, and is attached to the inner end of the horizontal knife or cutter S, which reciprocates in a horizontal toothed casing or finger-bar, S′, Figs. 5 and 6.

When the machine is used as a hedge-trimmer, a coupling-bar, T, Fig. 6, is passed through the slotted standards C C′, and is pivoted to the standard C′ by means of a pin, $m$. To one end of this coupling-bar T is attached the inner end of the finger-bar S′.

The knife S and finger-bar S′ are raised or lowered to any desired extent by means of a lever, U, to the center of which is attached a rod, $p$, which connects with one end of a lever, U′, that is pivoted to the top of the standard C, the other end of said lever U′ being connected by a rod, $p'$, to the coupling-bar T, that supports said knife and finger-bar. By manipulating the lever U the knife S and its finger-bar can be raised and lowered or adjusted to any desired angle, so that the top of the hedge can be trimmed to any desired shape.

V is the driver's seat, and W is the tongue or pole.

The bar T and finger-bar S′ support a slotted plate, $S^2$, that carries a series of reciprocating rakes, $S^3$. These rakes are actuated by the sprocket-wheel $h$ on the shaft J by a belt or chain, $s$, that passes under the tightening-pulley $b$ and around a sprocket-wheel, $t$, on a crank-shaft, $u$, that has its bearings in journal-boxes on the standard $a$ and cross-bar D′, the cranked end of the shaft $u$ being connected to a pitman, $P^2$, that is pivoted to an arm or bar, $v$, attached to the rake-frame, as shown in Figs. 5 and 6. The play of the rake $S^3$ is limited by a slot, $w$, and pin $z$, which also serve as a guide to hold the rakes in line while being reciprocated. By means of these rakes the brush cut from the top of the hedge by the knife S is brought gradually back, and thence passed to the ground in the rear of the machine.

To the driving-wheel F′ is secured a sprocket-wheel, $f^8$, that is connected by a chain or belt, $s'$, to a sprocket-wheel, $t'$, on a shaft, $t^2$, that is journaled in bearings at the upper part of the machine, and carries a revolving rake or reel, Y, the arms of which serve to bring down the hedge-tops onto the cutter S, bar S′, and rakes $S^3$, when they are cut and thrown off to the ground, as above explained. The belt or chain $s'$ is passed over guide-pulleys $b'$ $b'$, by which it is held taut and removed out of the way of the driver's seat V, as shown in Fig. 1.

It will be seen by reference to Fig. 4 that the shaft $t^2$ of the reel Y is so arranged that the reel can be adjusted to any desired position.

It will be seen that when the wheels F F′ are revolved in drawing the machine forward, motion will be transmitted to the crank-wheel K by means of the gears G G′, shaft H, gear-wheels I I′, and shaft J, said crank-wheel K also imparting motion to the vertical knife or cutter N by means of the pitman L and lever M, and also to a toothed clearing-rod, N², the upper end of which is attached to the lever M, as shown in Fig. 4, while its lower end reciprocates in a loop or bearing, k', on the front cross-bar. This clearing-rod N², which is preferably inclined, as shown, pushes the brush as fast as cut away from the machine—a necessity which formerly required one man's entire attention. The crank-wheel K also actuates the horizontal knife or cutter S by means of the pitman P, lever Q, and rod R, the horizontal brush-rakes S³ being reciprocated from the shaft J by means of the sprockets h t, chain s, crank-shaft u, pitman P², and rod v. The drive-wheel F', which thus actuates by intermediate mechanism the cutters N S, toothed clearing-rod N², and horizontal brush-rakes S³, also rotates the revolving reel Y through the sprockets f³ t', chain s', and shaft t². It will be readily seen that by these devices an alternate reciprocating motion is imparted to the knives or cutters N S, one cutting while the other is getting into position to cut. The hedge-tops are at the same time brought down to the action of the cutters by the revolving reel Y, while the horizontally-reciprocating rakes S³ and the vertically-inclined clearing-rod or toothed bar N² are engaged in removing the fragments of brush.

The actuating mechanism is so arranged as to give a slower motion to the rakes S³ than is imparted to the cutters S N and toothed clearing-rod N², the horizontal rakes S³ being thus enabled to handle the cut brush with greater facility.

By arranging the pivoted bar T as above described it will be seen that it is enabled to support the horizontal cutter and rakes in such a manner as to allow for ample adjustments to varying heights.

In order to prevent the gearing I I' and shaft J from becoming clogged by the brush thrown down by the rakes S³, a hood, K', Fig. 2, is provided.

The cutters and rakes can be readily unshipped, if desired, when moving the machine from place to place, a cradle, M', or receptacle being arranged on one side of the machine for their reception. This cradle has perforations m', in which the teeth of the cutters and cutter-bars are received, the horizontal rake being set on its side with the teeth toward the center of the machine.

As before observed, the machine can be readily changed into a very effective mower, it being only necessary to remove the pivoted bar T from the position shown in Figs. 3, 4, and 6, and with it the horizontal toothed casing or finger-bar S' and knife S, while the rake S³ is detached, the end of the bar T being then pivoted back of the front cross-bar, B, as shown by dotted lines in Fig. 2. The crank-wheel K is then connected by a pitman, P', to the rear end of a vibrating lever, X, that is pivoted over the axle of the wheel F', the forward end of said lever X being connected to the cutter S by a pitman, P³. The rod or chain p having been lengthened, the lever U' and bar T are again connected and the machine is then ready for mowing. The rakes S³ are detached from the bar T when its position is changed, the cutter N, with its bar N' and clearing-rod N², being unshipped or not, as desired.

Having thus described my invention, what I claim as new, and desire to secure by Letters Patent, is—

1. The combination, with the coupling-bar T and horizontal cutter S, of the brush-carrying rake S³, substantially as shown and described.

2. The combination, with the lever M, cutter-bar N, and finger-bar N', of the toothed clearing rod or bar N², said cutter and clearing-rod being arranged in a vertically-inclined position, substantially as shown and described.

3. The combination of the horizontal cutter S, brush-carrying rake S³, vertically-inclined cutter N, toothed clearing-rod N², and means for actuating the same, substantially as shown and described.

4. The combination of the cutters N S, brush-carrying rake S³, vertically-inclined clearing-rod N², and revolving reel Y, substantially as shown and described.

5. The combination, with the adjustable coupling-bar T, horizontal cutter-bar S, and finger-bar S', of the reciprocating brush-carrying rake S³, pitman P, shafts u and J, sprockets t h, and belt or chain s, substantially as shown and described.

In testimony whereof I affix my signature in presence of two witnesses.

JACOB V. LATTNER.

Witnesses:
WM. EDWARDS,
T. I. A. BROWN.